April 21, 1936.  J. F. FRESE  2,037,713
ELECTRIC AIR COOLING SYSTEM FOR VEHICLES
Filed July 14, 1934
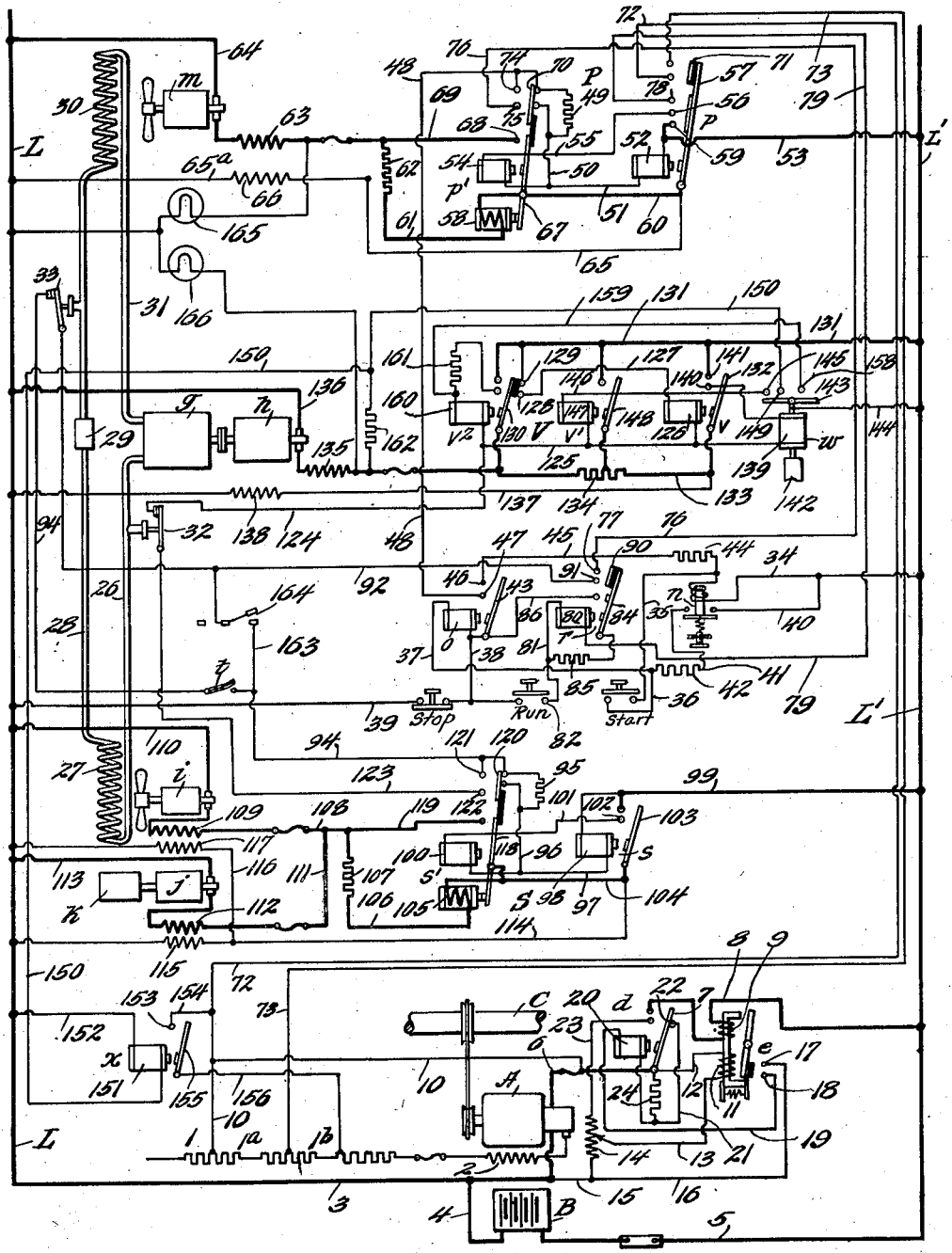
Inventor
Joseph F. Frese
By Robert Watson
Attorney Patented Apr. 21, 1936

2,037,713

UNITED STATES PATENT OFFICE 2,037,713

ELECTRIC AIR COOLING SYSTEM FOR VEHICLES

Joseph F. Frese, Baltimore, Md., assignor to Monitor Controller Company, Baltimore, Md., a corporation of Maryland Application July 14, 1934, Serial No. 735,272

9 Claims. (Cl. 62—117)

This invention relates to a cooling system for cooling the air in railway cars. The system comprises a generator driven from the car axle and a battery charged by the generator, a refrigerating unit comprising a compressor, and condensing and refrigerating coils, a motor for operating the compressor, a fan motor for circulating the air in the car past the refrigerating coil, and one or more motors for circulating air and water around the condensing coil.

In the operation of the system the fan motor for circulating air past the refrigerating coil is first started, and this motor may operate independently of the other motors to circulate the air. The motor or motors associated with the condensing coil cannot operate except while the motor associated with the refrigerating coil is in operation because of inter-locking connections between the starter for the latter motor and a control circuit for the starter of the motor or motors associated with the condensing coil. This control circuit is completed through a relay which can be closed only when the fan motor associated with the refrigerating coil is in operation. When the relay is closed by the manual operation of a switch the motor or motors associated with the condensing coil can operate automatically when a thermostat in the control circuit closes, and providing that a low pressure switch associated with the refrigerating unit is also closed. The motor which operates the compressor cannot operate until and unless the motors associated with the condensing coil are in operation. When the starter for the latter motors is closed it connects the control circuit to an extension thereof which passes through a high-pressure switch on the refrigerating unit and thence to a starter for the motor which operates the compressor and the latter motor then operates. Should the high pressure switch open the control circuit, the compressor motor will stop, but the motors associated with the condensing coil will continue to operate, to cool the coil as rapidly as possible. Should the thermostat switch or the low pressure switch open, all of the motors except the fan motor associated with the refrigerating coil will stop.

The invention includes means for cutting off the current to the control circuit of the starter for the motor associated with the refrigerating coil when the voltage in the supply circuit falls below a predetermined value, in order to prevent injury to the motors which might result from operating on low voltage. The means for accomplishing this includes a low voltage relay and a relay for closing the control circuit to said starter, so associated and connected that the jarring of the relays by the movement of the car will not interfere with maintaining the control circuit complete until the voltage drops to an exact predetermined value.

In the accompanying drawing wherein the cooling system is illustrated diagrammatically, A indicates a generator operated from a car axle C, and B indicates a battery which is kept charged by the generator. The field strength of the generator is controlled by third-brush regulation and by a resistance 1 in series with the shunt field 2 and means, hereinafter described, for varying the resistance in series with the field winding in accordance with the load on the generator. One brush of the generator is connected by conductor 3 to the supply wire L and by conductor 4 to one terminal of the battery and the other terminal of the battery is connected by conductor 5 to the supply wire L'. The other brush of the generator is connected by conductor 6 to the arm 7 of a contactor d adapted to connect conductor 6 to the supply wire L' through conductor 8 which extends through series coil 9 of a reverse current relay e to said supply wire. The shunt field circuit is completed between the conductor 6 and the resistance 1 by conductor 10. The reverse current relay has an energizing coil 11 connected to the main brushes of the generator through conductors 6, 12, 13, resistance 14 and conductors 15 and 3. When the voltage of the generator is above that of the battery the energizing coil causes the relay arm to close a circuit through the magnet 20 of contactor d as follows: from conductor 15 through conductor 16 to the contact 17, thence to contact 18, thence by conductor 19 to the magnet 20, thence through conductor 21, in shunt to resistance 24, to contact 22 and contactor arm 7 to conductor 6, and thence to the generator. When the arm 7 closes it connects the generator to the battery and the coil 9 acts cumulatively with the coil 11 to hold the reverse current relay closed as long as current is flowing from the generator to the battery. The contactor d also inserts resistance 14 in parallel with the energizing coil of the reverse current relay through conductor 23, thus reducing the current flowing in said coil after the reverse current relay has closed, this being made possible by reason of the fact that the series coil 9 acts cumulatively with the energizing coil to hold the relay closed as long as the voltage of the generator is above that of the battery. The closure of the contactor d also opens a shunt around resistance 24, leaving this in series with the magnet 20 while the contactor is closed. When the generator slows down until its voltage is below that of the battery, the reverse current relay opens, thus breaking the circuit to the magnet 20 of contactor d and the latter opens the circuit between the generator and the battery. The energizing coil of the reverse current relay is always connected to the generator, and therefore when the generator voltage rises above that of the battery, the relay will close and the circuit from the generator to the battery will again be completed.

The refrigerating unit comprises a compressor g from the outlet side of which a pipe 26 leads to a condensing coil 27 and from said coil a pipe 28 leads through an expansion valve 29 to a refrigerating coil 30 and a return pipe 31 extends from the latter coil to the inlet side of the compressor. An electric motor h operates the compressor; a motor i operates a fan to blow air around the condensing coil; a motor j operates a pump k to spray water on said coils, and a fan motor m circulates the air in the car around the refrigerating coil.

In this system the air circulating motor m must be started before any of the other motors can be put in operation. This is accomplished by closing a push button switch marked "Start". By then closing a push button switch marked "Run", motors i and j, which circulate air and water around condensing coil 27, will be brought into operation, providing control circuits, which include a thermostat switch t, and a low pressure switch 33, are closed, and this will be followed by operation of the compressor motor providing a high pressure switch 32 is also closed. Should the high pressure switch open, the compressor motor will be stopped but the fan and pump motors i and j will continue in operation in order to reduce the pressure in the condensing coil as rapidly as possible.

The normally open "Start" push button switch is in a circuit which extends from supply wire L' by way of conductor 34 through the coil of a relay n, thence through conductor 35 to "Start" push button switch, thence by conductors 36 and 37 to the coil of relay o, thence by conductor 38 to conductor 39 through push button switch marked "Stop" to supply wire L. Depression of the "Start" switch will cause the magnets of relays n and o to be simultaneously energized and each will close a holding circuit for the other. Thus relay n will close a holding circuit for the magnet of relay o as follows: from supply wire L' and conductor 34 through conductor 40 to the switch of relay n, thence through conductor 41 and resistance 42 to conductor 37 and coil of relay o, and thence through conductors 38 and 39 to supply wire L. Relay o, through its switch arm 43, will close a holding circuit for the magnet of relay n as follows: from supply wire L' through conductor 34 and coil of relay n, thence through resistance 44 and conductor 45 to contact 46, thence through switch arm 43 and conductors 38 and 39 to the supply wire L. Thus, upon depression of the "Start" push button switch, both of these relays will close, providing the voltage on the supply wires is above a predetermined value sufficient to operate the several motors without injury.

The relay o, in addition to establishing a circuit for the coil of relay n, controls a circuit for a starter P for the fan motor m through the engagement of the arm 43 with a contact 47 connected to conductor 48 which leads to the magnets of said starter, as hereinafter explained. It is important that the contact arm of relay o shall remain firmly closed and not vibrate when the voltage drops close to the predetermined value at which the starter circuits should be opened to protect the motors. If this relay alone were depended upon to open the control circuit for the starter P, its magnet would have to be wound so as to release the arm 43 at the critical voltage and jarring of the train might cause its contact arm to vibrate and open the circuit above that critical voltage. Therefore the magnet of the relay o is wound so that it would attract the arm 43 strongly at the critical voltage while the relay n whose magnet circuit is controlled by relay o will be adjusted so as to open at the critical voltage. Hence the relay o will remain firmly closed until the low voltage relay n opens and breaks the circuit through the magnet of relay o.

The circuit for the starter P which is opened and closed by the relay o extends from supply wire L through conductor 39, "Stop" switch, conductor 38, arm 43 and contact 47 to conductor 48, thence through a resistance 49, which is normally shunted, to conductors 50 and 51, thence through the coil of magnet 52 and by conductor 53 to supply wire L'. When the magnet 52 is energized contactor p completes a circuit through the shunt magnet 54 of auxiliary contactor p' from conductors 50 and 51 through the coil of said magnet, thence by conductor 55 to a contact 56 which is connected by the contactor arm 57 to conductor 53 and supply wire L'. Simultaneously with the closure of the circuit through the shunt magnet 54 of the auxiliary contactor, a circuit is closed through its series magnet 58 and through the circuits of the fan motor m. The series circuit extends from supply wire L' through conductor 53 to contact 59, thence through the contactor arm 57 to conductor 60, thence through the coil of the series magnet 58 to conductor 61, thence through a starting resistance 62 and thence through series field 63 to the armature of the motor, and thence by conductor 64 to the supply wire L. The shunt field circuit extends from the contactor arm 57 through conductor 65 to the shunt field coil 66 and thence by conductor 65ᵃ to supply wire L. The series and shunt coils of the starter will both attract the centrally pivoted contact arm 67 but the series coil will prevent the arm from moving until the fan motor m has accelerated and the counter-electromotive force has reduced the current in the series circuit sufficiently to permit the series magnet to release the arm 67, when the arm will be moved to closed position by the shunt magnet. The arm 67 is connected to the conductor 60 and when the arm moves to closed position it engages a contact 68 which is connected by conductor 69 to the armature circuit of the motor, and thereby the starting resistance and the series magnet 58 are short-circuited. The motor then operates at full speed. When the contact arm 67 moves to closed position, an insulated contact piece 70 opens a circuit around the resistance 49 and this is placed in series with the shunt coil 54 and with the coil of the magnet 52 to reduce the current flowing in said coils while the motor m is in operation.

The closure of the contactor p, through an insulated contact 71 on the contactor arm, short-circuits a section 1ᵃ of the generator field resistance 1, through conductors 72 and 73, thus strengthening the current in the field coil 2, so that the current output of the generator will be increased to compensate for the current taken by the fan motor m.

The closure of the contact arm 67 of the contactor p' causes the insulated contact piece 70 thereon to bridge two stationary contacts 74 and 75 and thereby connect conductor 48 to conductor 76 which leads to a stationary contact 77 of a relay r which is open at this time. Since the conductor 48 is at this time connected to the supply wire L through arm 43 of relay o and conductors 38 and 39 and the "Stop" switch, the contact 77 is connected to said supply wire by operation of the contactor p'. The contactor p, in closing, connects the supply wire L', through conductor 53, arm 57 and contacts 59 and 78 with a conductor 79 which extends to the coil of magnet 80 of relay r and thence by conductor 81 to a stationary contact 82 of a normally open push button switch, marked "Run," adapted to complete a circuit through the coil 80.

Assuming the relays n and o and the contactors of starter P to be closed and the air circulating motor m to be in operation, following the closure of the "Start" push button, and the contact 77 of the relay r and contact 82 of the push button switch "Run" to be connected to the supply wire L through the contactors p' and p of the starter P, respectively, as described, the next step is to close the push button switch "Run", which operation causes the relay r to close a control circuit for the starter S which latter controls the starting and stopping of the fan motor i and pump motor j. The control circuit for the magnet 80 of the relay r extends from the supply wire L through conductor 39, "Stop" push button, "Run" push button, conductor 81, coil 80, conductor 79 through inter-lock on contactor p and conductor 53 to supply wire L'. When the switch "Run" is closed, this circuit is completed and the relay r closes. When the relay r closes, its contact arm 84 closes a holding circuit for its magnet 80 in shunt to switch "Run" through conductors 38 and 86 to arm 84, thence through resistance 85 and conductor 81 to coil 80.

When the relay r closes an insulated contact 90 on its arm completes the control circuit for the magnets of the starter S as follows: from the supply wire L through conductor 39 and the "Stop" switch and conductor 38 and arm 43 of relay o to conductor 48, thence through contacts 74, 70 and 75 of contactor p' to conductor 76, thence through contacts 77, 90 and 91 of relay r to conductor 92, thence through low pressure switch 33 and conductor 94 through thermostat switch t to resistance 95, which is normally shunted, thence through conductor 96 to conductor 97 and coil 98 of contactor s and thence through conductor 99 to supply wire L'. Conductor 97 is also connected to one terminal of the shunt magnet 100 of auxiliary contactor s', and the other terminal is connected by conductor 101 to a contact 102 of contactor s. When the contactor arm 103 closes, it completes the circuit through the coil 100. Simultaneously the contactor s completes the circuit from its arm 103 through conductor 104 to the series coil 105 of contactor s', thence through conductor 106 and starting resistance 107 to conductor 108 and series field 109 of fan motor i, thence through the armature of the motor and by conductor 110 to the supply wire L. The series field and armature of the pump motor j are connected in parallel with the series field and armature of the fan motor i by conductor 111 which leads from conductor 108 to the series field 112 of motor j, thence through the armature of said motor and by conductor 113 to the supply wire L. The shunt fields of these motors are also connected in parallel by conductor 114 which extends from contactor arm 103 to shunt field 115 of motor j and thence to supply wire L, and a conductor 116, branching from conductor 114, extends through shunt field 117 of motor i and thence to the supply wire L. When the magnets of the auxiliary contactor s' are energized, the contactor arm 118 is attracted by both magnets but the series magnet prevents the contactor arm from closing until the counter-electromotive force of the motors causes the series magnet 105 to weaken, when it is over-powered by the shunt magnet and the contactor arm closes, short-circuiting the series magnet and the starting resistance through a conductor 119 which is connected from conductor 104 through arm 118 to a contact connected to conductor 119. The motors i and j then operate at full speed. An insulated contact 120 on the contactor arm 118 opens the shunt around the resistance 95 and the latter is thereby placed in circuit with the coils of magnets 98 and 100, to reduce the current flowing therein.

From the foregoing, it will be seen that after the air circulating motor m has been started a circuit for the relay r is made up through the starter for said motor and when said circuit is completed by closing the push button "Run" the relay r completes a control circuit for the starter S through the low pressure switch and thermostat switch and if these are closed the starter S operates to start the fan and pump motors associated with the condenser coils.

The closure of the auxiliary contactor s' of the starter S completes the control circuit to a starter V which controls the circuit of the compressor motor h. Thus, when the auxiliary contactor of the starter S closes, the insulated contact piece 120 on the arm 118 engages stationary contacts 121 and 122, the former connected to the control wire 94 leading via conductor 92 from relay r through the low pressure switch 33 and the thermostat switch to the starter S, and the contact 122 being connected by conductors 123 and 124 to conductor 125, thence through coil 126 of main contactor v, thence by conductor 127 to contacts 128 and 129 which are normally closed by the arm 130 of contactor $v^2$, thence by conductor 131 to supply wire L'. When this extension 123—124 of the control circuit is closed by the starter S, the contactor v is energized and its contact arm 132 completes the circuits of the compressor motor from supply wire L' through conductor 131 to contactor arm 132, thence through conductor 133 and starting resistance 134 to series coil 135, thence through the armature and conductor 136 to the supply wire L. The shunt field circuit extends from contactor arm 132 and conductor 133 through conductor 137 and shunt field 138 to the supply wire L. Upon closure of the contactor v the compressor motor starts and a circuit is also completed by the contactor arm 132 from conductor 125 through coil 139 of retarded relay w to a contact 140 which is connected by the contactor arm to contact 141, which latter is connected by wire 131 to supply wire L'. The core of the relay moves upward, suitably retarded, as by a dash pot 142. A contact member 143 on the relay is connected by a conductor 144 to the supply wire L', and as this contact member moves upward it engages first a contact 145 which is connected by conductor 146 to coil 147 of auxiliary contactor v' and thence to conductor 125. When magnet 147 is energized, its arm 148 cuts out a part of the starting resistance 134. As the contact member 143 of the retarded relay continues to move upward it next engages a contact 149 which is connected by conductor 150 to the coil 151 of a relay $x$ and thence by a conductor 152 to the supply wire L. This relay has a stationary contact 153 connected by conductor 154 to the wire 72 which is connected to the field resistance of the generator, and the arm 155 of the relay is connected by conductor 156 to said resistance; hence when the relay closes, the sections $1^a$ and $1^b$ of the resistance will be short-circuited through the relay switch and the generator field will be strengthened by the cutting out of the section $1^b$ to increase the generator output in order to compensate for the load placed on the generator by the pump motor $j$ and compressor motor $h$, the section $1^a$ having previously been cut out by the starter for the motor $m$. As the contact member of the retarded relay $w$ moves further upward, it engages a contact 158 which is connected by conductor 159 to the coil of contactor $v^2$ and thence to the control wire 124—125. When this contactor closes, it cuts out the remainder of the starting resistance in the circuit of the motor $h$ and establishes a holding circuit for the magnet 160 through resistance 161, so that the contactor remains closed. The closure of this contactor opens the circuit through the coil of the magnet of contactor $v$ and the arm of the latter falls to open position, opening the circuit through the coil of the retarded relay $w$. The contact member of the latter relay then drops downward, interrupting the circuit through wire 159 to the magnet of relay $v^2$, which magnet is now energized through its holding circuit, and also interrupting the circuit through wire 150 to the cut-out relay $x$, which is now kept energized by current flowing through contactor $v^2$, conductor 133, and resistance 162 to conductor 150, and finally opening the circuit through contactor $v'$.

For testing purposes, a circuit 163, in which is a hand switch 164, is connected to conductors 92 and 94 in shunt to the low pressure switch 33 and thermostat switch $t$. By closing this switch when the relay $r$ is closed, the motors $i$, $j$ and $h$ may be operated for test purposes even when the thermostat switch or the low pressure switch is open.

A signal lamp 165, connected to the armature circuit of the fan motor $m$, indicates when this motor is in operation, and a signal lamp 166, connected to the armature circuit of the compressor motor, indicates when the latter motor is in operation.

From the foregoing it will be seen that the motor $m$ for circulating air past the refrigerating coil 30 must be in operation before any of the other motors can be started. This motor is started by pressing the "Start" push button and may be kept running continuously while the car is in service. When the "Start" push button is closed, the relays $o$ and $n$ become energized and the closure of the relay $o$ causes the operation of the starter P. This starter makes up a circuit to the magnet of the run relay $r$ and the latter may be energized by depression of the "Run" push button switch. The starter P and the run relay $r$, combined, make up a control circuit for the starter S through the low pressure switch 33 and thermostat switch $t$ and when these switches are closed this starter will cause the fan motor and pump motor associated with the condensing coil to operate. If the thermostat switch is open the latter motors will not operate; when the thermostat switch closes, due to rising temperature in the car, these motors will be automatically started. Under some unusual conditions in the refrigerating system, the low pressure switch may open and if this occurs the control circuit to the starter S will open and the motors $i$ and $j$ will stop.

The starter S controls the starter V and hence the latter cannot operate to start the compressor motor $h$ unless the motors $i$ and $j$, which circulate air and water around the condenser coil, as well as the fan motor $m$, are in operation. The control circuit from the starter S to the starter V leads through the high pressure switch 32, and if this should open it will interrupt the circuit to the starter V and cause the stoppage of the compressor motor, but the motors $i$ and $j$ will continue in operation in order to cool the condenser coil as quickly as possible. When the high pressure switch again closes, the starter V will again operate to start the compressor, providing all of the other motors are in operation. When the starter V operates to start the compressor motor, a circuit to the relay $x$ is closed by the starter and this relay cuts out a section of the field resistance of the generator to increase its field strength and compensate for the additional load placed on the generator.

To stop all of the motors it is merely necessary to depress the stop push button, which will cause the relay $o$ to open the control circuit to the starter P, and since this starter, through the inter-locks described, controls the operation of the various other motors, all of the motors will be prevented from operating.

If the voltage on the supply wires falls below a predetermined value, the relay $n$ will open the circuit of relay $o$ and the latter will open the control circuit to the starter P and thereby prevent operation of any of the motors.

While I have shown separate motors $i$ and $j$ for operating a fan and a pump, these motors are connected in parallel and are started and stopped simultaneously, and it will be evident that the fan and pump might be operated by a single motor if desired.

What I claim is:

1. In a cooling system for the air of a railway car, in combination, a source of current including a battery and an axle driven generator for charging the same, a resistor in the field circuit of the generator, a compressor, a motor for driving said compressor, a starter to connect said motor to said source of current, a cooling coil supplied with refrigerant by said compressor, a motor driven fan to circulate the air of the car over said coil, a starter for said fan motor to connect the same to said source of current, a condenser in the refrigerant circuit, a motor for circulating cooling fluid for said condenser, a starter for said condenser motor to connect the same to said source of current, circuits interlocking said automatic starters, a manual starter button to initiate operation of the automatic starter for the fan motor, a manual "Run" button to initiate operation of the automatic starter for the condenser motor, said interlock circuits preventing operation of any other motor until the fan motor is in operation, the interlock circuits initiating operation of the automatic starter for the compressor motor after the condenser motor is in operation, means to independently stop the compressor motor under abnormal operation, means to stop the compressor and condenser motors in accordance with the cooling demands of the car and to start them in the sequence demanded by said interlocks, and means associated with the automatic starters to cut out portions of said generator field circuit resistor automatically as certain of said motors are started to increase the generator current in accordance with demand.

2. In a cooling system for the air of a compartment, in combination, a source of current, a cooling coil, a motor driven fan to circulate the air for said compartment over said coil, a starter for said fan motor to connect the same to said source of current, a compressor to supply refrigerant to said coil, a motor for driving said compressor, a starter to connect said compressor motor to said source of current, a condenser in the refrigerant circuit, a motor for circulating cooling fluid for said condenser, a starter to connect said condenser motor to said source of current, manual means to initiate operation of the automatic starter for the fan motor, means associated with said automatic starter to condition the starter of the condenser motor for operation when the fan motor is in operation, manual means to initiate operation of the starter for the condenser motor, a circuit closed by the starter for the condenser motor to supply current to actuate the compressor motor starter, a switch to open said circuit to prevent operation of the starter or to stop said compressor motor, means responsive to an abnormal condition of said compressor to open said switch, said condenser and compressor motor starters being so interlocked that the first must be running before and during the operation of the second, and means to stop the condenser motor when the compartment is sufficiently cooled.

3. In a cooling system for the air of a compartment, in combination, a source of current, a cooling coil, a motor driven fan to circulate the air for said compartment over said coil, a starter for said fan motor to connect the same to said source of current, a compressor to supply refrigerant to said coil, a motor for driving said compressor, a starter to connect said compressor motor to said source of current, a condenser in the refrigerant circuit, a motor for circulating cooling fluid for said condenser, a starter to connect said condenser motor to said source of current, manual means to initiate operation of the automatic starter for the fan motor, means associated with said automatic starter to condition the starter of the condenser motor for operation when the fan motor is in operation, manual means to initiate operation of the starter for the condenser motor, a circuit closed by the starter for the condenser motor to supply current to actuate the compressor motor starter, and circuits interlocking the automatic starters of the compressor and condenser motors whereby the first can only operate during operation of the second.

4. In a cooling system for the air of a compartment, in combination, a source of current, a cooling coil, a motor driven fan to circulate the air for said compartment over said coil, a starter for said fan motor to connect the same to said source of current, a compressor to supply refrigerant to said coil, a motor for driving said compressor, a starter to connect said compressor motor to said source of current, a condenser in the refrigerant circuit, a motor for circulating cooling fluid for said condenser, a starter to connect said condenser motor to said source of current, manual means to initiate operation of the starter for the fan motor, means associated with said starter to condition the starter of the condenser motor for operation when the fan motor is in operation, manual means to initiate operation of the starter for the condenser motor, a circuit closed by the starter for the condenser motor to supply current to actuate the compressor motor starter, circuits interlocking the automatic starters of the compressor and condenser motors whereby the first can only operate during operation of the second, a thermostat switch responsive to the temperature of the air in the compartment, said switch when opened stopping the condenser motor whereby the interlock stops the compressor motor.

5. In a cooling system for the air of a compartment, in combination, a source of current, a cooling coil, a motor driven fan to circulate the air for said compartment over said coil, a starter for said fan motor to connect the same to said source of current, a compressor to supply refrigerant to said coil, a motor for driving said compressor, a starter to connect said compressor motor to said source of current, a condenser in the refrigerant circuit, a motor for circulating cooling fluid for said condenser, a starter to connect said condenser motor to said source of current, manual means to initiate operation of the starter for the fan motor, means associated with said last mentioned starter to condition the starter of the condenser motor for operation when the fan motor is in operation, manual means to initiate operation of the starter for the condenser motor, a circuit closed by the starter for the condenser motor to supply current to actuate the compressor motor starter, circuits interlocking the starters of the compressor and condenser motors whereby the first can only operate during operation of the second, a thermostat switch responsive to the temperature of the air in the compartment, said switch when opened stopping the condenser motor whereby the interlock stops the compressor motor, and a manual switch to de-energize said starters to simultaneously stop all motors.

6. In a cooling system for the air of a compartment, in combination, a source of current, a cooling coil, a motor driven fan to circulate the air for said compartment over said coil, a starter for said fan motor to connect the same to said source of current, a compressor to supply refrigerant to said coil, a motor for driving said compressor, a starter to connect said compressor motor to said source of current, a condenser in the refrigerant circuit, a motor for circulating cooling fluid for said condenser, a starter to connect said condenser motor to said source of current, manual means to initiate operation of the starter for the fan motor, means associated with said last mentioned starter to condition the starter of the condenser motor for operation when the fan motor is in operation, manual means to initiate operation of the starter for the condenser motor, a circuit closed by the starter for the condenser motor to supply current to actuate the compressor motor starter, a switch to open said circuit to prevent operation of the starter or to stop said compressor motor, means responsive to excess pressure in the refrigeration system to open said switch, to stop the compressor motor only, said condenser and compressor motor starters being so interlocked that the first must be running before and during the operation of the second, and means to stop the condenser motor when the compartment is sufficiently cooled.

7. In a cooling system for the air of a compartment, in combination, a source of current, a cooling coil, a motor driven fan to circulate the air for said compartment over said coil, a starter for said fan motor to connect the same to said source of current, a compressor to supply refrigerant to said coil, a motor for driving said compressor, a starter to connect said compressor motor to said source of current, a condenser in the refrigerant circuit, a motor for circulating cooling fluid for said condenser, a starter to connect said condenser motor to said source of current, manual means to initiate operation of the starter for the fan motor, means associated with said last mentioned starter to condition the starter of the condenser motor for operation when the fan motor is in operation, manual means to initiate operation of the starter for the condenser motor, a circuit closed by the starter for the condenser motor to supply current to actuate the compressor motor starter, said condenser and compressor motor starters being so interlocked that the second can only run while the first is running, and means to stop the condenser motor upon the occurrence of abnormally low pressure in the refrigeration system.

8. In a cooling system for the air of a railway car, in combination, a source of current including a battery and an axle driven generator for charging the same, a compressor, a motor for driving said compressor, a starter to connect said motor to said source of current, a cooling coil supplied with refrigerant by said compressor, a motor driven fan to circulate the air of the car over said coil, a starter for said fan motor to connect the same to said source of current, a condenser in the refrigerant circuit, a motor for circulating cooling fluid for said condenser, a starter for said condenser motor to connect the same to said source of current, circuits interlocking said starters, a manual button to initiate operation of the starter for the fan motor, a manual "Run" button to initiate operation of the starter for the condenser motor, said interlock circuits preventing operation of any other motor until the fan motor is in operation, the interlock circuits initiating operation of the starter for the compressor motor after the condenser motor is in operation, means to independently stop the compressor motor under abnormal operation, and means to stop only the compressor and condenser motors in accordance with the cooling demands of the car and to start them in the sequence demanded by said interlocks.

9. In a cooling system for the air of a railway car, in combination, a source of current including a battery and an axle driven generator for charging the same, a compressor, a motor for driving said compressor, a starter to connect said motor to said source, a cooling coil supplied with fluid refrigerant by said compressor, a motor driven fan to circulate the air of said car over said coil, a starter to connect said fan motor to said source, a condenser in the refrigerant circuit, a motor for circulating cooling fluid for said condenser, a starter to connect said condenser motor to said source, circuits interlocking said starters whereby the operation of the fan motor starter conditions the condenser motor starter, and operation of the condenser motor starter conditions the compressor motor starter and means to independently determine the running and stopping of each motor, the interlocks then determining the operation of related motors.

JOSEPH F. FRESE.